United States Patent Office 2,895,880
Patented July 21, 1959

2,895,880

SUSTAINED RELEASE PHARMACEUTICAL PRODUCT

Fritz Rosenthal, Park Forest, Ill., assignor, by mesne assignments, to Smith, Kline & French Laboratories, Philadelphia, Pa., a corporation of Pennsylvania No Drawing. Application May 13, 1955
Serial No. 508,293

6 Claims. (Cl. 167—82)

This invention relates to a sustained release pharmaceutical product and, more particularly, relates to such a product where the medicament is dispersed in a sustained release material providing a gradual release of the medicament over a long period of time, for example, not less than 3 hours.

In accordance with this invention there is provided a sustained release phermaceutical product in which the medicament is dispersed throughout the sustained release material. The product of this invention eliminates the presence of undesirable residues after the digestive process. Further, it can be readily shaped into any desirable form by simple manufacturing procedures. In addition, it has a stability which provides a long shelf life over a wide range of temperature conditions. Further, the release rate of the product of this invention can be readily controlled and can be modified after the product is formed.

The sustained release material in accordance with this invention is a digestible non-toxic film forming polymeric material, preferably a protein, which is substantially insoluble in an aqueous solution having a pH in the range of from about 1 to about 8 and at a temperature of about 37° C. and will preferably be present in an amount of from about 20% to about 45% by weight of the final product. By way of example the sustained release material in accordance with this invention may be a prolamine, such as, for example, zein, gliadin, hordein or kafirin. The prolamine will have a salt point in the range of from about 0.2 to about 0.5, preferably from about 0.2 to 0.3. The release rate of the prolamine increases with an increase in the salt point.

Prolamines are produced by alcoholic extraction and are available commercially. They can be produced by the methods disclosed in, for example U.S. Patents 2,238,591, 2,287,649 or 2,221,560.

Prolamines having the desired salt point range can be produced by, for example placing the prolamine in solution in a lower fatty alcohol-water solution and adding an alkali such as sodium hydroxide to provide a pH of about 10. After from about ¼ to about 2 hours, depending on how high a salt point is desired, a mineral acid such as sulfuric acid is added to neutralize the solution and the thus treated zein precipitated by the addition of water, filtered and washed with cold water. The longer the prolamine is in the presence of the alkali, the higher the salt point will be driven. If desired, heat can be employed to increase the speed of the process.

The salt point referred to above is determined as follows: A 1% solution of prolamine in 0.05 N NaOH is maintained at 25° C. and titrated with an aqueous solution 1.0 N NaCl and 0.05 N NaOH. The salt point is calculated from the volume in cubic centimeters of the sodium chloride-sodium hydroxide solution consumed on reaching the point of permanent turbidity of the prolamine solution.

The sustained release material may be modified by being admixed with non-ionic dispersing agents such as, for example, polypropylene glycol-ethylene glycol condensation products, an allyl aryl polyether alcohol, polyoxyethylene sorbitan monostearate, an allyl-phenylether of a polyethylene glycol, lecithin and a diacetyl tartaric acid ester of monoglycerides.

The dispersing agent facilitates the shaping of the product and also acts to increase the medicament release rate. When used, the dispersing agent is preferably present in an amount of from about 0.05% to 5% by weight of the sustained release material.

Plasticizers may also be added to the sustained release material in order to facilitate shaping it. In order to achieve a proper sustained release rate of the medicament, the plasticizer must be either water soluble or digestible. Exemplary of water soluble plasticizers are polypropylene glycols, triethylene glycol, diethanolamine, triethanolamine. Exemplary of digestible plasticizers are glyceryl monostearate, glyceryl monooleate, glyceryl monopalmitate. When used, the plasticizer will preferably be present in an amount of from about 5% to about 35% by weight of the sustained release material.

Any desired medicament or combination of medicaments can be dispersed in the sustained release material, thus, for example, the following medicaments are satisfactory: a sympathomimetic agent, such as, for example, dextroamphetamine sulfate, racemic amphetamine sulfate, racemic or d-desoxyephedrine hydrochloride, an antispasmodic agent, such as, for example, hyoscyamine, atropine, or scopolamine hydrobromide, an antihistamine, such as, for example, chloroprophenpyridamine maleate, a barbiturate, such as, for example, phenobarbital, barbital, amobarbital, an antibiotic, such as, for example, tetracycline, etc. Various extenders and fillers which are conventionally used, such as, for example, terra alba, lactose, and starch, may also be admixed with the medicament or with the sustained release material when desired.

The product in accordance with this invention may take numerous forms. Preferably, the dispersion of medicament in the sustained release material will be in the form of small cylindrical pellets which may be encapsulated in a dosage unit form. This form is advantageous since it provides a wide dispersion of the medicament in sustained release form throughout a wide region in the digestive tract. Further, this form provides a more predictable rate of release for any given dispersion of medicament in sustained release material. The pellets will preferably have a diameter of from about ⅛" to about ½₂", a length in the range of from about ⅛" to about ½₂", a sufficient number of these pellets being placed in a gelatin capsule to form a desired unit dose.

Alternatively, other pharmaceutical forms are also suitable, thus, for example, the medicament dispersed in the sustained release material can be formed into a single dosage tablet. Where bulky medicaments are involved, it may be advantageous to have small pellets or particles simply in a container for dispensing as bulk dosages.

To prepare a product in accordance with this invention, the sustained release material is placed in a mixer to which water and a lower fatty alcohol, preferably ethyl or isopropyl alcohol, are added. Advantageously, there will be used 60 parts by weight of water to about 90 parts by weight of alcohol. It will be appreciated, of course, that this range vary widely for solubility, thus, for example, it is satisfactory to use water in an amount of from about 10% to about 67% by weight of the alcohol. A sufficient amount of the water-alcohol mixture is used to place the sustained release material in solution. To the thus formed solution there is then added the medicament. The thus formed mass is thoroughly mixed. If the mass is not already of a plastic consistency, a sufficient amount of the solvent is evaporated off or more solvent is added until plasticity is achieved.

Where it is desired to include a dispersing agent, a plasticizer, or an ingredient to modify the release rate of the sustained release material, or inert materials, these ingredients may conveniently be added to the mass immediately after the addition of the solvent.

Where the desired product involves the use of small pellets, it is preferred to subject the thus formed dispersion of medicament in sustained release material to extrusion. The extrusion can be carried out in any conventional screw feed extrusion equipment capable of maintaining a uniform temperature control and having a relatively small discharge orifice. Preferably this orifice will have a diameter in the range of from about ⅛" to 1⁄32", preferably about 1⁄16".

The above prepared plastic mass will be placed in the supply chamber of the extrusion machine, the plastic mass being preferably at about room temperature. The plastic material is then extruded using an orifice temperature within the range of from about room temperature to about 90° C. It will be appreciated that there is room for considerable balancing between the amount of heat and the amount of solvent used. Where the medicament is sensitive to solvents, little or no solvent will be employed and more heat; on the other hand, where a medicament is heat sensitive it may be desirable to employ less heat and more solvent. In order to form small pellets the extruded strands are cut to predetermined lengths, preferably approximating the diameter of the strand. The residual solvent of the thus formed pellets can then be removed with the aid of heat and/or vacuum.

Where it is desired to form granules in lieu of the above formed extruded pellets in the form of cylinders, the plastic mass used in the above described extrusion process can be placed in conventional granulating apparatus and forced through a screen to form conventionally shaped granules of the desired mesh size, preferably from about 30 U.S. mesh to about 12 U.S. mesh.

When desired, the pellets in granule form, as produced by conventional granulating machines, can be tableted through the use of conventional tableting apparatus. In tableting, conventional techniques would preferably be employed, namely, combining the pellets formed as described above with lubricants such as, for example, stearic acid and its salts such as the sodium, potassium, calcium or magnesium salts and with dispersing agent such as starch, alginic acid or hydrogen carboxymethylcellulose.

Where a prolamine is used, the medicament release rate can be modified by denaturing the prolamine by, for example, heating the product at a temperature preferably from about 90°–110° C. for a period of from about 10 minutes to about five hours. Thus treating the product of this invention results in decreasing the release rate and has the added advantage of increasing the heat stability of the prolamine constituent for a wide range of temperatures. Superior heat stability is achieved by heating in the range of from about 90° C. to about 110° C. for not less than about 1 hour.

The invention will be further clarified by the following examples:

Example 1

100 grams of commercial grade zein, 200 grams of isopropyl alcohol and 200 grams of water containing 3.1 grams of sodium hydroxide was maintained at a temperature of 70° C. for 45 minutes and then cooled to room temperature. The solution was neutralized using sulfuric acid. A sufficient amount of cold water was added to precipitate the thus treated zein. The precipitate was covered by filtration and thoroughly washed with cold water to provide 50 grams of the washed zein having a salt point of .5. This was then taken up in 100 grams of isopropyl alcohol. The resulting solution was thoroughly mixed with 12.5 grams of propylene glycol and 188 grams of amobarbital for about 1 hour. The thus formed dough was extruded through an extruder having a series of orifices of 1⁄16" diameter with the orifices area heated to about 90° C. The extruded strands were cut into 1⁄16" lengths and then dried in a vacuum oven at 40° C. The thus formed pellets were then used to fill #3 hard gelatin capsules.

Example 2

A prolamine derived from corn gluten, known as zein, 200 grams, was dissolved in a mixture of 400 grams of isopropyl alcohol and 400 grams of water containing 3.1 grams of sodium hydroxide. The solution was heated to 60° C. for 30 minutes. It was then neutralized by the addition of the proper amount of sulfuric acid and cooled to room temperature. The prolamine so treated was then precipitated by the addition of water, filtered and washed with ample amounts of cold water, to remove the water-soluble portion of the reaction product. The zein so modified had a salt point of 0.22. An isopropyl alcohol-water solution containing 160 grams of this modified zein was compounded with 40 grams of polypropylene glycol 150 and 600 grams of amobarbital in a sigma-blade mixer. Agitation was continued for 1 hour while the mixer was closed and hot water passed through the mixer jacket. Then, the mixer was opened and enough water and isopropyl alcohol allowed to evaporate until an extrudable dough was obtained. This dough was extruded through an extruder having a series of orifices of 1⁄16" diameter using an extruder temperature of 90° C. at the orifice. The extruded strands were cut into lengths of 1⁄16" and dried in a vacuum oven at 50° C. They were then used to fill #3 hard gelatin capsules.

Example 3

A prolamine derived from green sorghum, known as kafirin, 200 grams, was dissolved in a mixture of 400 grams of isopropyl alcohol and 400 grams of water containing 3.1 grams of sodium hydroxide. The solution was heated to 60° C. for 30 minutes. It was then neutralized by the addition of the proper amount of sulfuric acid and cooled to room temperature. The prolamine so treated was then precipitated by the addition of water, filtered and washed with ample amounts of cold water to remove the water-soluble portion of the reaction product. The kafirin so modified had a salt point of 0.20. An isopropyl alcohol-water solution containing 160 grams of this modified kafirin was compounded with 40 grams of polypropylene glycol 150 and 600 grams of amobarbital in a sigma-blade mixer. Agitation was continued for 1 hour while the mixer was closed and hot water passed through the mixer jacket. Then, the mixer was opened and enough water and isopropyl alcohol allowed to evaporate until an extrudable dough was obtained. This dough was extruded through an extruder having a series of orifices of 1⁄16" diameter using an extruder temperature of 90° C. at the orifice. The extruded strands were cut into lengths of 1⁄16" and dried in a vacuum oven at 50° C. They were then used to fill #3 hard gelatin capsules.

Example 4

A prolamine derived from corn gluten, known as zein, 240 grams, was dissolved in a mixture of 480 grams of isopropyl alcohol and 480 grams of water containing 7.44 grams of sodium hydroxide. The solution was heated to 70° C. for 45 minutes. It was then neutralized by the addition of the proper amount of sulfuric acid and cooled to room temperature. The prolamine so treated was then precipitated by the addition of water, filtered, and washed with ample amounts of cold water to remove the water-soluble portion of the reaction product. The zein so modified had a salt point of 0.50. An isopropyl alcohol solution containing 160 grams of this modified zein was compounded with 40 grams of polypropylene glycol 150, 0.8 gram of lecithin and 600 grams of amobarbital in a sigma-blade mixer. Agitation was continued for 1 hour while the mixer was closed and hot water passed through the mixer jacket. Then, the mixer was opened and enough water and isopropyl alcohol allowed to evaporate until an extrudable dough was obtained. This dough was extruded through an extruder having a series of orifices of $\frac{1}{16}''$ diameter using an extruder temperature of 90° C. at the orifice. The extruded strands were cut into lengths of $\frac{1}{16}''$ and heated in an oven to 110° C. for 1 hour. After cooling, they were used to fill #1 hard gelatin capsules.

It is not desired to be limited except as set forth in the following claims.

What is claimed is:

1. A solid pharmaceutical product providing a gradual release of medicament over a long period of time, comprising a medicament dispersed in a material selected from the group consisting of zein, gliadin, hordein and kafirin, said material being from about 20% to about 45% by weight of said product and having a salt point in the range from about 0.2 to about 0.5.

2. A solid pharmaceutical product providing a gradual release of medicament over a long period of time, comprising a medicament dispersed in a material selected from the group consisting of zein, gliadin, hordein and kafirin, said material being from about 20% to about 45% by weight of said product, having a salt point in the range of from about 0.2 to about 0.5 and being denatured.

3. A solid pharmaceutical product providing a gradual release of medicament over a long period of time, comprising a medicament dispersed in a material selected from the group consisting of zein, gliadin, hordein and kafirin, said material being from about 20% to about 45% by weight of said product, having a salt point in the range of from about 0.2 to about 0.5 and being denatured and a nonionic dispersing agent in an amount of from about 0.05% to 5% by weight of said material.

4. A solid pharmaceutical product providing a gradual release of medicament over a long period of time, comprising a medicament dispersed in zein, said zein having a salt point in the range of from about 0.2 to about 0.5 and being from about 20% to about 45% by weight of said product.

5. A solid pharmaceutical product providing a gradual release of medicament over a long period of time, comprising a medicament dispersed in denatured zein, said zein having a salt point in the range of from about 0.2 to about 0.5 and being from about 20% to about 45% by weight of said product.

6. A solid pharmaceutical product providing a gradual release of medicament over a long period of time, comprising a medicament dispersed in denatured zein, said zein having a salt point in the range of from about 0.2 to about 0.5 and being from about 20% to about 45% by weight of said product and a nonionic dispersing agent in an amount of from about 0.05% to 5% by weight of the zein.

References Cited in the file of this patent

UNITED STATES PATENTS

| | | |
|---|---|---|
| 874,310 | Donard | Dec. 17, 1907 |
| 2,508,477 | Stievater et al. | May 23, 1950 |
| 2,566,200 | Hickey | Aug. 28, 1951 |
| 2,736,682 | Hermelin | Feb. 28, 1956 |
| 2,738,303 | Blythe | Mar. 13, 1956 |
| 2,793,979 | Svedres | May 28, 1957 |

OTHER REFERENCES

Thompson et al.: "History, Literature and Theory of Enteric Coatings," J.A.P.A., Sci. Ed., vol. 34, No. 5, May 1945, p. 135.

J. Am. Pharm. Asso., Sci. Ed., vol. 41, No. 3, March 1952, pp. 157–161.

"Atlas Spans and Atlas Tweens," Atlas Powder Co., Wil., Del., 1942.